UNITED STATES PATENT OFFICE.

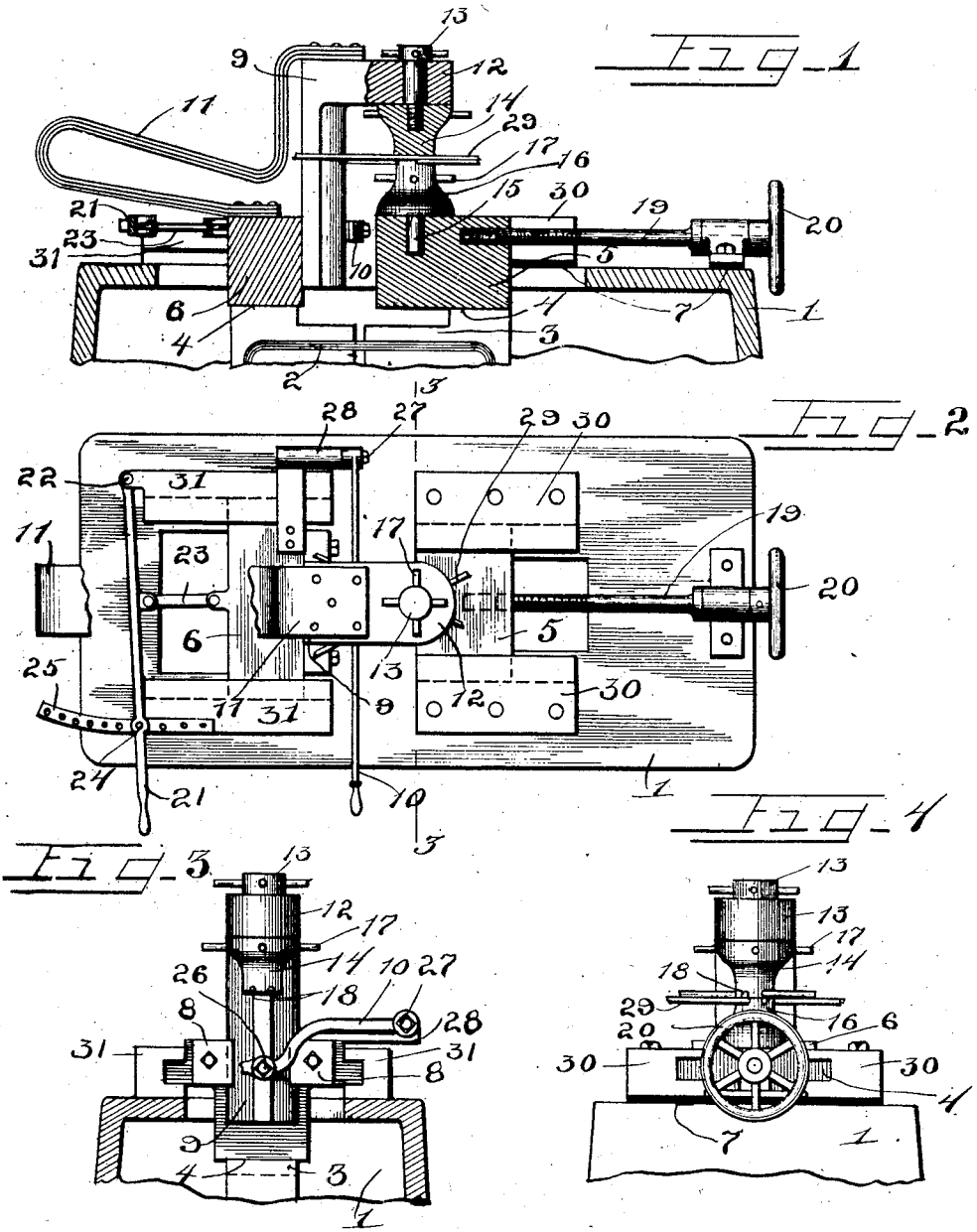

WILLIAM ERASTUS WILLIAMS, OF CHICAGO, ILLINOIS.

ELECTRIC-WELDING CLAMP

No. 864,348.

Specification of Letters Patent.

Patented Aug. 27, 1907.

Application filed July 21, 1905. Serial No. 270,730.

*To all whom it may concern:*

Be it known that I, WILLIAM ERASTUS WILLIAMS, a citizen of the United States of America, and a resident of Chicago, county of Cook, and State of Illinois, have invented certain new and useful Improvements in Electric-Welding Clamps, of which the following is a specification.

The object of my invention is to provide electric welding clamps peculiarly adapted for making lap welds and for welding a wide range of work, such as chairs, tables, fence posts, ladders and numerous other articles.

Reference will be had to the accompanying drawing in which

Figure 1, is a sectional elevation, Fig. 2, is a plan view. Fig. 3 is a detail on line 3—3 of Fig. 2. Fig. 4 is an end elevation.

In the drawings, 1 designates the cast iron frame inclosing the ordinary transformer coils 2 of which is the primary and 3 the secondary. The secondary is provided with contact surfaces 4 in close electrical connection with electrode blocks 5 and 6, which are mounted in suitable guideways 30 and 31 to slide to and from each other. The block 5 and its guideways are insulated from the frame 1 by insulating material 7.

Mounted in vertical guides 8 on block 6 there is an electrode block or arm 9 arranged to work vertically by means of a hand lever 10 or other suitable means. A flexible electric conductor 11 aids in carrying current between blocks 6 and 9. Fixed by screw 13 to projection 12 of block 9 there is a contact piece 14 which may be revolved around the screw 13 in its adjustments in bringing the contact seats 18 in the right position to fit the parts to be welded. Resting on block 5 and held thereto by a stud 15 there is the lower contact piece 16 which may be adjusted by revolving it about the stud as an axis. Pins 17 enable the operator to revolve the blocks as desired.

The seats 18 in contact blocks 14 and 16 are here shown for welding round rods to each other at their crossings and by the adjustments of the blocks the rods may be welded in almost any relation to each other.

The block 5 is adjusted in horizontal position by the screw rod 19 moved by a hand wheel 20, and block 6 is moved horizontally by a hand lever 21 pivoted at 22 and connected by link 23 to block 6 and secured in fixed position by a pin 24 in a segment 25. Thus any desired horizontal position of the parts may be secured permitting different sizes of blocks 9 having longer or shorter projections 12 to be used for variation in the work. The controlling lever 10 is connected at 26 to block 9 and pivoted at 27 to a block 28 on block 6 and moves with block 6 in its adjustments.

The arrangements of the device is such that a large grillage, chair back, or any similar structure may be welded together by lap welds, whenever there are apertures in the structure that permit the entry of the head of block 9 through them adjacent to the welding points.

Rods 29 are shown in the clamps in the act of welding.

What I claim is:

1. In a welding device, the combination with two electrode blocks mounted to move toward and from each other, of a contact piece borne by one of said blocks, and a second, co-acting contact piece carried by the other block and arranged to move, transversely to the plane of said blocks, to and from its companion, to grip the work at the welding point.

2. In a welding device, the combination with two electrode blocks, of means for adjusting their distance apart in their plane, a revolubly adjustable contact piece projecting from one of said blocks transversely to their plane, a second, co-acting contact piece carried by the other block and arranged to move toward and from said plane, to grip the work at the welding point.

3. In a welding device, the combination with two primary electrode blocks and means for adjusting their separation, of a secondary electrode block mounted upon one of the primary blocks to move transversely to the plane of the latter, a contact piece borne upon one lateral face of the other primary block, a second, co-acting contact piece borne by said secondary block, and a flexible conductor connecting said secondary block to the primary block which carries it.

4. In a welding device, the combination with two electrode blocks mounted to move independently toward and from each other, of a lever arranged to move one block back and forth in its path, a screw arranged to adjust the other block in its path, a removable contact piece projecting laterally from one of the blocks, a second, co-acting contact piece carried by the other block in the axial line of the first contact piece when the parts are properly adjusted, and means for at will moving the second contact piece to and from its companion.

5. The combination with a suitable frame, of an electrode block mounted thereon to move back and forth and provided with a lateral, revolubly adjustable contact piece, of means for forcibly moving said block in its path, a second electrode in the line of movement of the first and provided with a contact block overhanging its companion, means for at will forcibly varying the separation of the two co-acting contact blocks, and means for supplying a welding current through said electrodes, contact blocks, and the work interposed between the latter.

6. The combination with a suitable frame, of an electrode block mounted to move back and forth thereon, a contact block projecting from said block and revolubly adjustable thereon, a second electrode block mounted in the line of movement of the first, a second contact piece carried by the second electrode block in the axial line of the first contact piece when the parts are properly adjusted, and means for moving the second contact piece toward and from its companion.

7. The combination with a suitable frame, of two primary electrode blocks mounted thereon to move toward and from each other, a secondary electrode block mounted upon one of the first mentioned blocks to move back and forth thereon in a direction transverse to the plane of the latter and to overhang the companion primary block, two co-acting contact pieces mounted upon the overhanging secondary block and the companion primary block, respectively, and means for at will putting one primary block, the secondary block, its contact piece, the work, the other contact piece and the other primary block in a welding circuit.

8. In a welding device, a set of movable electrode blocks mounted to move to and from each other, a secondary electrode block mounted upon one of the first mentioned blocks and adapted to move in a plane vertical to the plane of the first set of blocks, a contact piece mounted adjustably on the secondary block and a contact piece mounted upon the other of the first mentioned blocks as described.

Signed at Chicago this 21st day of March 1905.

WILLIAM ERASTUS WILLIAMS.

Witnesses:
WILLIAM F. DUNHAM,
JOHN W. WRAITH.